US006209606B1

(12) United States Patent
May et al.

(10) Patent No.: US 6,209,606 B1
(45) Date of Patent: Apr. 3, 2001

(54) APPARATUS FOR PRODUCING PACKAGING MATERIAL HAVING A TEAR TAPE

(75) Inventors: Geoffrey Bilson May, Beeston; Brian Frederick Davis, Carlton; Wladyslaw Lakiyan Nowak, Arnold, all of (GB)

(73) Assignee: P. P. Payne Limited, Giltway (GB)

( * ) Notice: Subject to any disclaimer, the term of this patent is extended or adjusted under 35 U.S.C. 154(b) by 1133 days.

(21) Appl. No.: 08/658,014

(22) Filed: Jun. 4, 1996

Related U.S. Application Data

(60) Continuation of application No. 08/018,068, filed on Feb. 16, 1993, now abandoned, which is a division of application No. 07/733,365, filed on Jul. 19, 1991, now Pat. No. 5,203,935, which is a continuation of application No. 07/294,749, filed on Jan. 9, 1989, now abandoned, which is a division of application No. 06/595,311, filed on Mar. 30, 1984, now Pat. No. 4,844,962.

(30) Foreign Application Priority Data

Mar. 31, 1983 (GB) .................................................. 8308932

(51) Int. Cl.[7] ............................ B32B 35/00; B65H 23/18

(52) U.S. Cl. ............................ 156/361; 156/543; 226/30; 226/31

(58) Field of Search .................................... 156/361, 494, 156/495, 516, 517, 521, 552, 543; 226/14, 30, 31; 242/420, 421.8, 421.9

(56) References Cited

U.S. PATENT DOCUMENTS

| | | | | |
|---|---|---|---|---|
| 2,760,414 | | 8/1956 | Cornock et al. . | |
| 2,825,557 | | 3/1958 | Jacobsen . | |
| 3,088,848 | | 5/1963 | Tritsch . | |
| 3,097,844 | * | 7/1963 | Huck | 226/30 X |
| 3,187,982 | | 6/1965 | Underwood et al. . | |
| 3,280,393 | | 10/1966 | Crossley . | |
| 3,618,870 | * | 11/1971 | Martin | 242/421.9 |
| 3,757,631 | * | 9/1973 | McManus | 156/465 X |
| 3,899,143 | * | 8/1975 | Slezak | 242/421.8 X |
| 3,934,837 | * | 1/1976 | Keilhack et al. | 242/420 X |
| 4,203,270 | | 5/1980 | Forman | 53/133 |
| 4,208,932 | | 6/1980 | Anderson | 83/311 X |
| 4,278,213 | | 7/1981 | Rubruck | 242/75.1 |
| 4,317,695 | * | 3/1982 | Asar Madhu P. et al. | 156/361 X |
| 4,400,230 | * | 8/1983 | Wyslotsky | 156/361 |
| 4,433,784 | | 2/1984 | Kjelgaard | 206/617 |
| 4,498,274 | | 2/1985 | Vorhauer | 53/412 |
| 4,844,962 | | 7/1989 | May et al. | 428/43 |

FOREIGN PATENT DOCUMENTS

| | | |
|---|---|---|
| 840380 | 7/1960 | (GB) . |
| 1257126 | 12/1971 | (GB) . |
| 775990 | 10/1971 | (ZA) . |

* cited by examiner

*Primary Examiner*—Curtis Mayes
(74) *Attorney, Agent, or Firm*—Harness, Dickey & Pierce, P.L.C.

(57) ABSTRACT

A teartape for packaging materials, and particularly such materials based on polyolefin films, includes a base film coated with a pressure sensitive adhesive composition. The teartape is affixed to the packaging material by the adhesive composition. This avoids the problem of distortion which can occur when affixing conventional teartapes to such packaging materials by means of hot melt wax compositions. The teartape is applied to moving packaging material by controlling the speed of the teartape in accordance with the speed of the packaging material so as to reduce tension imbalance. The speed of the teartape may be controlled in dependence upon the tension in the teartape. This can be achieved by supplying the teartape from a dispenser having a brake means (4,5) and a drive means (10,11,12) for regulating the speed oft he teartape in dependence on the tension in the teartape.

6 Claims, 1 Drawing Sheet

APPARATUS FOR PRODUCING PACKAGING MATERIAL HAVING A TEAR TAPE

This is a continuation of U.S. patent application Ser. No. 018,068, filed Feb. 16, 1993 now abandoned, which is a divisional of Ser. No. 733,365, filed Jul. 19, 1991, now U.S. Pat. No. 5,203,935, which is a continuation of Ser. No. 294,749; filed Jan. 9, 1989 now abandoned, which is a divisional of Ser No. 595,311, filed Mar. 30, 1984, now U.S. Pat. No. 4,844,962.

BACKGROUND OF THE INVENTION

1. Field of the Invention

This invention relates to tapes and is concerned with tapes suitable for use as teartapes.

2. Description of the Prior Art

Teartapes are known to provide a means of facilitating the opening of packages such as packs of cigarettes, confectionery and the like including overwrapping formed form filmic packaging materials. They are adhered to the surface of the packaging material in a manner such that, in use, an end of the teartape can be pulled so as to tear the packaging material underlying the teartape to allow access to the contents.

Traditionally such teartapes have been made from cellulose film or derivatives of cellulose which are coated with barrier resistant and/or heat seal coatings. Such tapes can be readily applied to packaging material formed from films of a similar materials by moistening the coating with a solvent, to soften the coating, and applying heat and pressure to give firm adhesion. The replacement of cellulose-based packaging material by stronger and more cost effective polyolefin film packaging materials, and especially by biaxially oriented polypropylene films, has similarly led to the substitution of polypropylene for cellulose in teartape manufacture.

Polypropylene teartapes often comprise two-ply laminates of similar polypropylene film to provide increased tear strength and, also, to protect any print applied to the surface of the lower layer. Two methods have been employed to apply these polypropylene tapes to polyolefin film packaging materials. In the case where the polyolefin packaging material is a lacquer coated film a solvent is used to activate the coating and ensure adhesion of the teartape. Alternatively, if the polyolefin packaging material is uncoated, the teartape is caused to adhere by applying a hot melt wax composition. A lacquer coating is not, usually, a packaging requirement, when using polyolefin packaging film, since these have superior barrier properties to cellulose films. Also, in the case of polyolefins there is the opportunity to co-extrude films in order to provide for any specially demanding barrier properties. Hence, the use of lacquer coated polyolefin packaging film simply to promote the adhesion of a teartape involves an unacceptable coat penalty. The use of hot melt wax compositions is, also, undesirable since this gives rise to:

1. the need for cleaning,
2. the need for close attention by the operator to recharge the baths with adhesive wax and to ensure temperatures are correct in order to promote satisfactory adhesion,
3. a safety hazard with high temperature wax baths,
4. distortion of the packaging film and/or tape as a consequence of the heat of application or stress on cooling which can cause an unsightly "cockling" effect, and
5. poor and inconsistent adhesion to film, especially, on starting and restarting the lamination process.

These disadvantages are particularly troublesome when stopping and starting the application of the teartape to the packaging film and the nature of the teartapes and their means of application are such that relatively small spools of tape containing no more than 2500–5000 meters have had to be used, thus, causing frequent stoppages on fast operating packaging lines. The present invention provides a teartape suitable for applying to polyolefin film packaging materials without the foregoing disadvantages.

SUMMARY OF THE INVENTION

The present invention, generally, provides an improved method of applying a tape to a film packaging material, as well as a novel means for applying a tape to film packaging material.

According to one aspect of the present invention there is provided a teartape for applying to film packaging materials, particularly to polyolefin film packaging materials, which teartape is formed from an oriented thermoplastic plastic material base film coated with a pressure sensitive adhesive composition.

The base film may, for example, have a thickness of from 20 to 100 microns and a width of from 1 to 10 mm. Preferably, the thickness is from 40 to 70 microns and the width is from 1.5 to 4 mm. The thermoplastic plastic material of the base film may be, for example a polyvinyl chloride or vinyl chloride copolymer, a linear polyester, or, preferably, a polyolefin, such as, polypropylene or a copolymer of propylene and ethylene. Preferably, the plastic material of the base film is monoaxially oriented since this provides improved cross tear resistance and enables a thinner tape to be produced than in the case where biaxially oriented or non-oriented material is used. Advantageously, the tensile strength of such polypropylene or ethylene/propylene copolymer tape is from 1500 to 3000 kg/cm$^2$ in the longitudinal direction and from 200 to 500 kg/cm$^2$ in the transverse direction. Also, in this preferred embodiment, the extension in the longitudinal direction is from about 30 percent to about 50 percent and the extension in the transverse direction is from about 800 percent to about 1000 percent.

Any suitable pressure sensitive adhesive composition may be used. Thus, it may, for example, be a natural or synthetic rubber of an acrylic compound and, normally, a primer coating will be provided between it and the surface of the base film so as to promote anchorage of the pressure sensitive adhesive composition. The surface of the base film which is not coated with the pressure sensitive adhesive composition will ordinarily be coated with a release agent.

In a particularly preferred embodiment, the base film is printed in a manner such that the printed matter is righted for reading when the teartape is adhered to the filmic packaging material. For example, the printed matter may be printed normally onto a surface of the base film and overcoated with a transparent pressure sensitive adhesive composition. Thus, when the teartape is adhered to the inner surface of the filmic packaging material, the printed matter is righted for reading when viewed through the filmic packaging material and the adhesive composition. In this way, the printed matter is protected from abrasion and from possible contact with the contents of the package. Alternatively, the printed matter may be printed in reverse on one surface of a transparent base film and overcoated with release agent, the other surface being coated with a transparent pressure sensitive adhesive composition. The printed matter will then be righted for reading when the teartape is adhered to the inner surface of the packaging material and viewed through he base film, the adhesive and the packaging material. The matter printed can be either decorative or informative. Thus the teartape can form a sales promotion aid and/or carry a health warning, for example, the case where it is used in cigarette packing.

The tape is such that it can be produced in the form of traverse wound reels containing a large quantity of tape (e.g. at least 30,000 meters).

In using the tape as a teartape it is applied to the surface of filmic packaging material and, particularly, polyolefin film packaging material and adhered thereto by means of the pressure sensitive adhesive composition.

According to another aspect of the present invention there is provided a method of applying a tape, such as the aforementioned pressure sensitive adhesive teartape, to the surface fo filmic packaging material, which comprises affixing an end portion of the tape to a portion of the surface, moving the surface so as to move the tape in a manner such that successive portions of the tape are drawn into contact with successive portions of the surface and become affixed thereto, and controlling the speed of movement of the surface, so as to reduce tension imbalance between the tape and the surface.

By reducing imbalance between the tension in those portions of the tape which are affixed to the surface and the tension in those portions of the surface to which tape is affixed, unsightly puckering is reduced. The method of the present invention is particularly useful in the case where the filmic packaging material surface is a polyolefin film material. In accordance with a preferred embodiment, the speed of movement of the tape is controlled in dependence upon the tension in that part of the tape which is being drawn towards the surface i.e. in a part of the tape which has yet to be affixed to the surface. Generally, the optimum value of this tension will be in the range of from 5 to 200 grams.

The desired tension in the tape can be achieved by utilizing a novel tape dispenser provided by the present invention. This aspect of the present invention provides a dispenser for supplying tape at a controlled tension to a location where it is to be affixed to a moving surface, the dispenser comprising: a frame carrying:

(a) a support means for receiving a reel of tape, the reel rotating as tape is drawn from the reel by said moving surface, (b) a guide means defining a tape path from the reel to said location, (c) a brake means for reducing the speed of rotation of the reel in dependence on a reduction in tension of the tape passing along said tape path, and (d) a drive means for increasing the speed of rotation of the reel in dependence on an increase in tension of the tape passing along said tape path.

In a particularly preferred embodiment, the guide means comprises first and second guide members, which are relatively movable, such that the length of the tape in the tape path is varied. Variations in tension of the tape in the tape path cause the members to move with respect to one another, so as to increase or decrease the length of the tape path, as appropriate. The movement of the guide members is arranged to control the brake means, whereby, as the tension increase, the brake means is released and, as the tension decrease, the brake means is applied. The drive means is such that it is approximately equivalent to the braking force and is, preferably, such as to exert a high torque at low speeds.

For a better understanding of the invention and to show how the same may be carried into effect, reference will now be made, to the accompanying figure in which:

DESCRIPTION OF THE PREFERRED EMBODIMENTS

Figure 1:
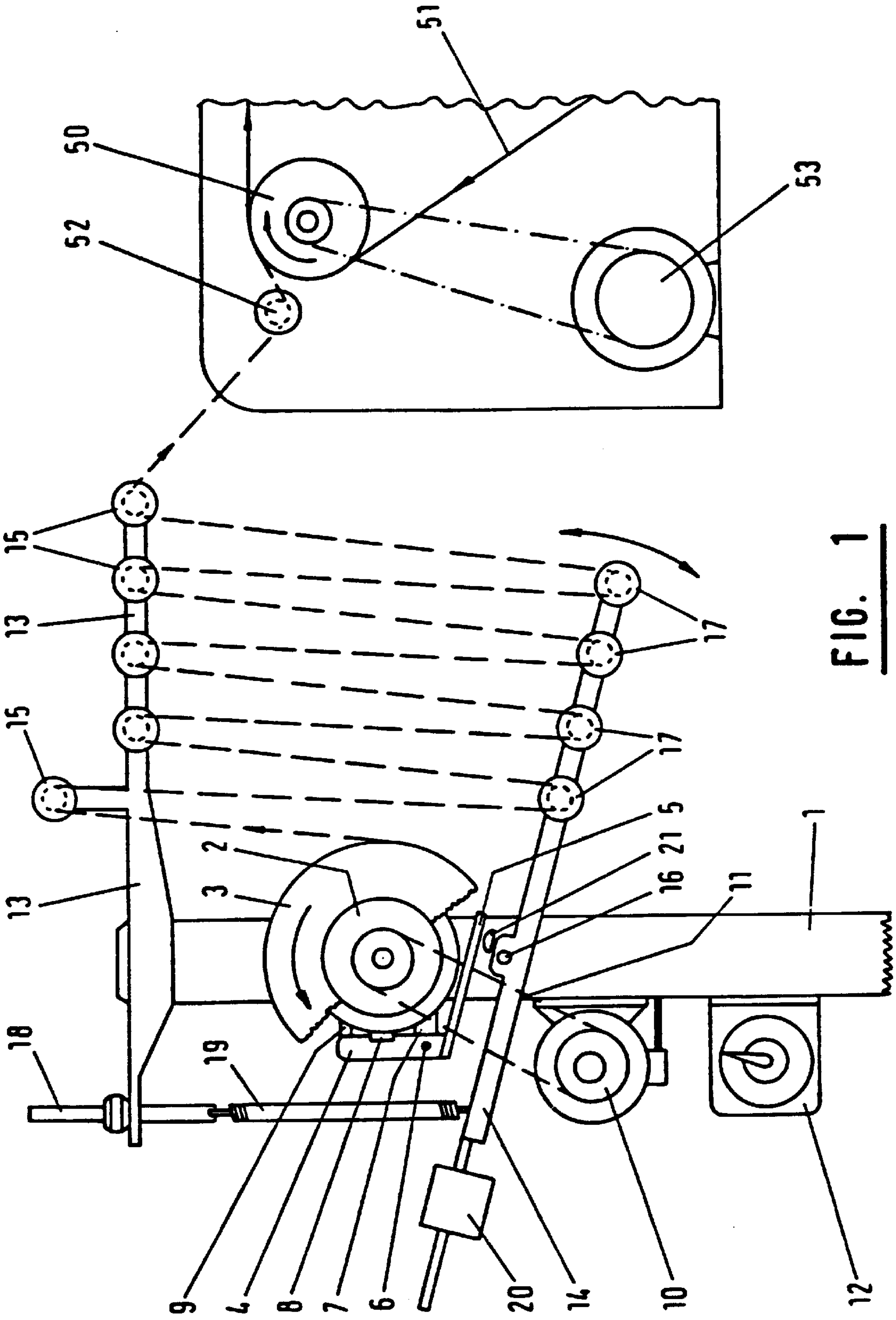
FIG. 1 shows a side view of a teartape dispenser in accordance with the present invention.

Referring to the figure, the dispenser comprises a, generally, vertical frame 1 including a, generally, horizontal rotatable spindle 2 for receiving a reel 3 of a teartape of the present invention in such a manner that the reel is freely rotatable with the spindle.

The dispenser includes a brake arranged to act upon the spindle so that upon actuation it reduces the rotation speed of the reel. The brake comprises a generally L-shaped member having first and second limbs 4, 5 which are mounted for pivotal movement about pin 6 passing through a bracket 7 fixed to the frame 1. The first limb 4 carries a brake pad 8 which ordinarily is urged into engagement with the spindle 2 by means of a spring.

A torque motor 10 is affixed to the frame 1 and rotates the spindle 2 (and hence the reel 3) by means of a belt drive 11. The motor 10 is controlled by means of an autotransformer 12 (a Variac control) mounted on the frame 1. The autotransformer 12 is capable of producing a continuously variable output voltage to drive the motor.

The dispenser is for use in conjunction with an overwrapping machine for applying filmic packaging material, and particularly polyolefin film packaging material, to packs of cigarettes, confectionery and similar articles. Only a part of this machine is shown in the drawing wherein reference numeral 50 denotes a roller over which the packaging material 51 passes en route to the station at which it is applied to the article to be packaged. The roller 50 is driven by motor 53 so as to move the packaging material through the machine. The free end of the tape is adhered to the packaging material and the tape is fed from the dispenser to the location where it is applied to the packaging material (i.e. to where the packaging material passes over roller 50) as a consequence of the movement of the packaging material, the reel 3 rotating, as appropriate, to allow the tape to be fed in this way. Thus, successive portions of the tape are drawn into contact with successive portions of the packaging material and become adhered thereto by the pressure sensitive adhesive coating of the tape.

The dispenser includes a guide which defines a tape path from the reel 3 to the roller 50. The guide comprises first and second guide members. The first guide member is in the form of a fixed arm 13 secured to the frame 1 and including a plurality of guide rollers 15. The second guide member is in the form of a compensating arm 14 pivotally mounted on frame 1 about a pin 16. The compensating arm 14 includes a plurality of guide rollers 17. One end of the fixed arm 13 carries a threaded adjusting screw 18. A tension spring 19 is provided between the end of the screw 18 and the compensating arm 14. The compensating arm 14 carries a slidable balance weight 20 and is provided with an adjustable screw 21, at a location where it can abut against the second limb 5 of the brake. A microswitch (not shown) is provided in a location where it will sense a predetermined lower position of the compensating arm 4 and disengage the motor 10.

The guide rollers 15 and 17, together with additional guide roller 52 of the packaging machinery define a tape path (shown by the broken line) between the reel 3 and the location at which the tape is to be applied to the packaging material.

In use, the slidng balance weight 20 is first adjusted so that the compensating arm 14 is in equilibrium about the fulcrum pin 16. The tape is then led from the reel 3 and threaded through guide roller 15, 17 and 52 and the free end is adhered to the packaging material 51 on roller 50. The tension of the tape in the tape path depends upon the tension in spring 19 (which is determined by adjusting screw 18) and the number of guide rollers traversed by the tape and these are selected so that the tension in the tape is as desired. The compensating arm 14 will, then, adopt a preferred disposition with respect to the fixed arm 13, and the brake and the motor 10 are, then, adjusted so that the compensating arm 14 ordinarily adopts this disposition during running conditions. This is achieved by appropriately setting the adjustable screw 21 and by appropriately setting the autotransformer 12 so that the torque developed by the motor 10 is just sufficient to overcome the braking force exerted by the brake. In this way, in the event that the speed of the packaging material 51 is less than the speed of the tape in the guide path, (i.e. when the tape is overrunning, for example when the packaging machinery is stopping), the resultant decrease in tension in the tape in the guide path allows the compensating arm 14 to pivot about pin 16 under the influence of tension spring 19 so as to extend the length of the tape path and thereby increase the tension in the tape. Simultaneously, this movement of the compensating arm also causes the brake pad 8 to become engaged with the spindle 2 whereby the speed of the spindle 2 (and hence the speed of the tape in the tape path) is decreased. The compensation arm also activates the aforementioned microswitch to disengage the motor 10 and thereby prevent any possible overriding of the brake. In the event that the speed of the tape in the tape path is less than the speed of the packaging material 51 (for example during start up of the packaging machinery), the tension in the tape in the tape path increases and causes the compensating arm 14 to pivot about pin 16 against the action of the spring 19 so as to reduce the length of the tape path and thereby decrease the tension in the tape. Simultaneously, this movement of the compensating arm 14 causes the brake pad 8 to become disengaged from the spindle 2 whereby the torque motor 10 can increase the speed of rotation of the spindle and hence increase the speed of the tape in the tape path. The use of a torque motor 10 to drive the spindle 2 and hence reel 3 is particularly valuable when reels containing a large quantity of tape are used since it can readily overcome the initial inertia of such reels. The torque motor drive provided maximum torque when the brake is applied and reduced torque as speed increases and, thus, reduces the tendency to snatch at start-up or to overrun on rapid deceleration.

By use of a tape dispenser of the above type, the speed of the tape in the tape path is controlled in dependence on the speed of the packaging material whereby the tension in the tape in the tape path is controlled so that it approximates to the optimum tension. Hence tension imbalance between the tape and the packaging material and the puckering effects caused thereby are significantly reduced.

The following examples illustrate the invention. In the examples all parts are by weight, absent contrary indications.

EXAMPLE 1

A uniaxially oriented film was formed from a copolymer of 90 percent propylene and 10 percent ethylene by extending a film of the copolymer on to chill casting rollers in a conventional manner followed by stretching the machine direction between heated rollers to impart a stretch of about six times the original length. After annealing the film had a tensile strength in the machine direction of 2800 kg/cm$^2$ with an elongation, at break of 30 to 50 percent. Elongation in the lateral direction was about 800 to 1000 percent at break. The film had a thickness of 40 microns and both surfaces fo the film were subjected to a corona discharge at 40 to 50 dynes per cm. One of the surfaces was then printed normally by a gravure process. (Other conventional printing processes such as a flexographic process may be used). The printed surface was, then, coated with a primer suitable for promoting anchorage of a subsequently applied coating of a transparent pressure sensitive adhesive composition. The non-printed surface was coated with a release agent.

The release agent comprised 100 parts of Silicolease 425 (ICI trade name for a 30 percent solids concentration of dimethyl polysiloxane and methyl hydrogen polysiloxane resins in toluene) together with 4 parts of Catalyst 62A and 4 parts Catalysts 62B (ICI trade names to describe a 50 percent solids concentration of amino alkoxy—polysiloxane in toluene and alkyl tin acylate in xylene). The release agent was applied to give a dry coating weight of 0.25 gms. per square meter. The primer was a solution in toluene of 25 parts of natural crepe rubber and 8 parts of a cross-linking agent (Vulcabond TX) applied over the printed surface to give a dry coating weight of 0.25 gms. per square meter. Vulcabond TX is manufactured by ICI and is a 50 percent solution of polyisocyanate (mainly diphenyl methane di-isocyanate) in xylene. The pressure sensitive adhesive composition was a solution of 100 parts of natural crepe rubber, 100 parts of a tackifying resin having a melting pint of 100°/115°C. (Akron P) and 1 part of an antioxidant (Irganox) dissolved in a hydrocarbon mixture (SBP2). this was applied by conventional reverse roll coating to give a dry coating weight of 15 to 20 gms. per square meter. Akron P is marketed by Arakara Chemicals and is a fully saturated allcyclic hydrocarbon resin and Irganox is marketed by Ciba Geigy and is a high molecular weight hindered polyphenol. The coated film was, them slit to a 3 mm width and the resultant teartape was traverse wound on to centers of internal diameter 150 mm and width 170 m to provide reels carrying continuous lengths of tape (e.g. 30,000 to 50,000 meters long, as required). The reels wee then inserted into a tape dispenser as shown in the drawing and this was used to apply the tape to a polypropylene packaging film in a film overwrap machine. The interacting tension compensator and brake mechanisms and the adjustable torque motor drive of the tape dispenser enable tension imbalance between the tape and the film to be avoided, particularly during starting and stopping of the machine. The printed matter on the teartape was righted for reading when viewed through the adhesive and the packaging film.

EXAMPLE 2

Example 1 was repeated using a pressure sensitive adhesive composition, a primer based on acrylic resins, and a release agent based on a different silicone resin. Similar results were obtained.

The pressure sensitive adhesive composition was a 45 percent solids solution of a self cross-linking acrylic polymer in a mixture of 37 parts ethyl acetate, 26 parts heptane, 26 parts isopropanol, 1 part toluene and 1 part acetylacetone. This is commercially available as Bondmaster 1054 from National Adhesive Ltd.

The primer was a mixture of 100 parts of the aforesaid Bondmaster 1054, 1400 parts of toluene, and 10 parts of the aforesaid Vulcabond TX.

The release agent comprised 20 parts of Syloff 7046, 79.9 parts of toluene and 0.1 part of a reactive siloxane polymer known as catalyst/cross linking agent 7048 (Dow Corning). Syloff 7046 is a mixture of reactive siloxane polymers available from Dow Corning.

Having, thus, described the invention, what is claimed is:

1. An apparatus for producing packaging material having adhered thereto a teartape comprising an oriented thermoplastic plastic material base film coated with a pressure sensitive adhesive composition by means of which the teartape is adhered to the packaging material which apparatus comprises: (a) means for moving the packaging material and (b) a dispenser for supplying the teartape at a controlled tension to a location where the teartape is to be adhered to the moving packaging material, which dispenser comprises a frame carrying:

(1) a support means for receiving a reel of the teartape so that the reel can rotate as tape is drawn form the reel by said moving packaging material, (2) a guide means defining a tape path from the reel to said location, (3) a brake means for reducing the speed of rotation of the reel in dependence on a reduction in tension of the teartape passing along said path, and (4) a drive motor for the reel for increasing the speed of rotation of the reel in dependence on an increase in tension of the tape passing along said path.

2. An apparatus as claimed in claim 1 wherein said guide means comprises first and second guide members which are relatively movable, in accordance with variations in tension of the tape in the tape path, so as to vary the length of the tape path, the relative movement of the guide members controlling the brake means whereby the brake means is released as the tension increases and the brake means is applied as the tension decreases.

3. An apparatus as claimed in claim 2 wherein the drive motor is operably connected to said guide members whereby, as the tension decreases, said relative movement of the guide members disengages the drive motor.

4. An apparatus for producing filmic packaging material having adhered thereto a teartape comprising an oriented thermoplastic plastic material base film coated with a pressure sensitive adhesive composition by means of which the teartape is adhered to the packaging material which apparatus comprises:

(a) means for moving the packaging material, and (b) a dispenser for supplying the teartape at a controlled tension to a location where the teartape is to be adhered to the moving packaging material, which dispenser comprises a frame carrying:

(1) a support means for receiving a reel of the teartape so that the reel can rotate as tape is drawn from the reel by said moving packaging material, (2) a guide means defining a tape path from the reel to said location, said guide means comprising:

a fixed guide member, a second guide member mounted for pivotal movement about a pin so as to be relatively movable with respect to the first guide member in accordance with variations in tension of the tape in the tape path, a tension spring extending between the guide members, and a slidable balance weight carried by the second guide member and adjustable so that the second guide member is in equilibrium about the pin, (3) a brake means provided so as to reduce the speed of rotation of the reel and controlled by relative movement of the members whereby the brake means is released as the tension of the tape increases and the brake means is applied as the tension of the tape decreases, and (4) a drive motor for driving the reel and having a rotational speed which increases in dependence on an increase in tension of the tape passing along said path.

5. A dispenser for supplying a teartape, comprising an oriented thermoplastic plastic material base film coated with a pressure sensitive adhesive composition, at a controlled tension to a location where the teartape is to adhered to moving filmic packaging material by means of the pressure sensitive adhesive composition, which dispenser comprises a frame carrying:

(1) a support means fo receiving a reel fo the teartape so that the reel can rotate as tape is drawn from the reel by said moving filmic packaging material, (2) a guide means defining a tape path from the reel to said location, (3) a brake means provided so as to reduce the speed of rotation fo the reel in dependence on a reduction in tension of the teartape passing along said path, and (4) a drive motor for driving the reel and having a rotational speed which increases in dependence on an increase in tension of the tape passing along said path.

6. A dispenser as claimed in claim 5 wherein (i) said guide means comprises:

a fixed guide member, a second guide member mounted for pivot movement about a pin so as to be relatively movable with respect to the first guide member in accordance with variations in tension of the tape in the tape path, a tension spring extending between the guide member and a slidable balance weight carried by the second guide member adjustable so that the second guide member is in equilibrium about pin, and (ii) the brake means is controlled by relative movement of members whereby the brake means is released as the tension of the increases and the brake means is applied as the tension of the decreases.

* * * * *

UNITED STATES PATENT AND TRADEMARK OFFICE
CERTIFICATE OF CORRECTION

PATENT NO. : 6,209,606 B1
DATED : April 3, 2001
INVENTOR(S) : Geoffrey Bilson May et al.

It is certified that error appears in the above-identified patent and that said Letters Patent is hereby corrected as shown below:

Title page,
Under Inventors, line 3, "Lakiyan" should be -- Lucyan --;

ABSTRACT,
Line 15, "oft he" should be -- of the --;

Column 1,
Line 8, ";" should be -- , --;
Line 21, "form" should be -- from --;
Line 32, "materials" should be -- material --;
Line 57, "coat" should be -- cost --;

Column 3,
Line 1, after "with" insert -- a --;
Line 5, "he" should be -- the --;
Line 9, after "warning" insert -- in --;
Line 26, after "the" (second occurrence in patent and application) insert -- tape in dependence on the speed of movement of the --;
Line 67, "increase" should be -- increases --;

Column 4,
Line 1, "decrease" should be -- decreases --;

Column 5,
Line 34, "compensation" should be -- compensating --;
Line 50, "provided" should be -- provides --;

Column 6,
Line 9, "fo" should be -- of --;
Line 16, "Silicolease" should be -- Silcolease --;
Line 31, "100" should be -- 110 --, and "pint" should be -- point --;
Line 33, "this" should be -- This --;
Line 39, "them" should be -- then --;
Line 41, "m" should be -- mm --;
Line 43, "wee" should be -- were --;

CERTIFICATE OF CORRECTION

PATENT NO. : 6,209,606 B1
DATED : April 3, 2001
INVENTOR(S) : Geoffrey Bilson May et al.

It is certified that error appears in the above-identified patent and that said Letters Patent is hereby corrected as shown below:

Column 7, claim 1,
Line 18, "form" should be -- from --;

Column 8, claim 5,
Line 24, delete "to";
Line 28, "fo" (first occurrence in patent) should be -- for --;
Line 28, "fo" (second occurrence in patent) should be -- of --;
Line 35, "fo" should be -- of --;

Column 8, claim 6,
Line 43, "pivot" should be -- pivotal --;
Line 47, "member" should be -- members --;
Line 48, after "member" insert -- and --;
Line 49, Amendment Dated 11/15/93; after "about" insert -- the --;
Line 51, after "of" insert -- the --;
Line 53, after "the" (first occurrence) insert -- tape --;
Line 54, Amendment Dated 11/15/93; after "the" (second occurrence) insert -- tape --.

Signed and Sealed this

Eleventh Day of December, 2001

*Attest:*

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,209,606 B1
DATED : April 3, 2001
INVENTOR(S) : Geoffrey Bilson May et al.

It is certified that error appears in the above-identified patent and that said Letters Patent is hereby corrected as shown below:

Title page,
Under Inventors, line 3, "Lakiyan" should be -- Lucyan --;

ABSTRACT,
Line 15, "oft he" should be -- of the --;

Column 1,
Line 8, ";" should be -- , --;
Line 21, "form" should be -- from --;
Line 32, "materials" should be -- material --;
Line 57, "coat" should be -- cost --;

Column 3,
Line 1, after "with" insert -- a --;
Line 5, "he" should be -- the --;
Line 9, after "warning" insert -- in --;
Line 26, after "the" (second occurrence in patent and application) insert -- tape in dependence on the speed of movement of the --;
Line 67, "increase" should be -- increases --;

Column 4,
Line 1, "decrease" should be -- decreases --;

Column 5,
Line 34, "compensation" should be -- compensating --;
Line 50, "provided" should be -- provides --;

Column 6,
Line 9, "fo" should be -- of --;
Line 16, "Silicolease" should be -- Silcolease --;
Line 31, "100" should be -- 110 --, and "pint" should be -- point --;
Line 33, "this" should be -- This --;
Line 39, "them" should be -- then --;
Line 41, "m" should be -- mm --;
Line 43, "wee" should be -- were --;

UNITED STATES PATENT AND TRADEMARK OFFICE

CERTIFICATE OF CORRECTION

PATENT NO. : 6,209,606 B1
DATED : April 3, 2001
INVENTOR(S) : Geoffrey Bilson May et al.

It is certified that error appears in the above-identified patent and that said Letters Patent is hereby corrected as shown below:

<u>Column 7, claim 1,</u>
Line 18, "form" should be -- from --;

<u>Column 8, claim 5,</u>
Line 24, delete "to";
Line 28, "fo" (first occurrence in patent) should be -- for --;
Line 28, "fo" (second occurrence in patent) should be -- of --;
Line 35, "fo" should be -- of --;

<u>Column 8, claim 6,</u>
Line 43, "pivot" should be -- pivotal --;
Line 47, "member" should be -- members --;
Line 48, after "member" insert -- and --;
Line 49, Amendment Dated 11/15/93; after "about" insert -- the --;
Line 51, after "of" insert -- the --;
Line 53, after "the" (first occurrence) insert -- tape --;
Line 54, Amendment Dated 11/15/93; after "the" (second occurrence) insert -- tape --.

Signed and Sealed this

Eighteenth Day of December, 2001

*Attest:*

JAMES E. ROGAN

*Attesting Officer*

*Director of the United States Patent and Trademark Office*